(12) United States Patent
Wu et al.

(10) Patent No.: US 8,691,916 B2
(45) Date of Patent: Apr. 8, 2014

(54) RETORTABLE EASY OPENING SEALS FOR FILM EXTRUSION

(75) Inventors: Xiaosong Wu, Sugar Land, TX (US); Kim L. Walton, Lake Jackson, TX (US); Lamy J. Chopin, III, Missouri City, TX (US); Morgan M. Hughes, Angleton, TX (US)

(73) Assignee: Dow Global Technologies LLC, Midland, MI (US)

( * ) Notice: Subject to any disclaimer, the term of this patent is extended or adjusted under 35 U.S.C. 154(b) by 40 days.

(21) Appl. No.: 13/465,140

(22) Filed: May 7, 2012

(65) Prior Publication Data

US 2013/0296494 A1    Nov. 7, 2013

(51) Int. Cl.
*C08F 8/00*   (2006.01)
*C08L 23/10*  (2006.01)
*C08L 33/02*  (2006.01)
*C08L 33/04*  (2006.01)
*C08L 35/02*  (2006.01)

(52) U.S. Cl.
USPC ........... 525/191; 525/221; 525/222; 525/240; 525/241

(58) Field of Classification Search
USPC .......................... 525/191, 221, 222, 240, 241
See application file for complete search history.

(56) References Cited

U.S. PATENT DOCUMENTS

| | | | |
|---|---|---|---|
| 4,599,392 A | 7/1986 | McKinney et al. | |
| 6,103,657 A | 8/2000 | Murray | |
| 6,245,856 B1 * | 6/2001 | Kaufman et al. | 525/240 |
| 6,320,005 B1 | 11/2001 | Murray | |
| 6,939,919 B2 * | 9/2005 | Tau et al. | 525/191 |
| 6,953,764 B2 | 10/2005 | Frazier et al. | |
| 7,355,089 B2 | 4/2008 | Chang et al. | |
| 7,794,849 B2 | 9/2010 | Lu et al. | |
| 2006/0199930 A1 | 9/2006 | Li Pi Shan et al. | |
| 2007/0016757 A1 | 1/2007 | Anderson et al. | |
| 2008/0311812 A1 | 12/2008 | Arriola et al. | |
| 2010/0093964 A1 | 4/2010 | Van Damme et al. | |

FOREIGN PATENT DOCUMENTS

| | | |
|---|---|---|
| EP | 604908 A2 | 7/1994 |
| EP | 1567335 A1 | 8/2005 |
| WO | WO-2001070878 A1 | 9/2001 |
| WO | WO-0238628 | 5/2002 |
| WO | WO-03/040195 | 5/2003 |
| WO | WO-2004/039583 A1 | 5/2004 |
| WO | WO-2004/050361 A1 | 6/2004 |
| WO | WO-2005/090426 A1 | 9/2005 |
| WO | WO-2007/044159 A1 | 4/2007 |
| WO | WO-2009012215 A1 | 1/2009 |
| WO | WO-2010/011124 A1 | 1/2010 |
| WO | WO-2010/147703 A2 | 12/2010 |
| WO | WO-2011/039314 A1 | 4/2011 |
| WO | WO-2011/084786 A1 | 7/2011 |

OTHER PUBLICATIONS

D. Lee, et al., Development of high temperature comprehensive two-dimensional liquid chromatography hyphenated with infrared and light scattering detectors for characterization of chemical composition and molecular weight heterogeneities in polyolefin copolymers, Journal of Chromatography A, 2011, vol. 1218, pp. 7173-7179.

* cited by examiner

*Primary Examiner* — Nathan M Nutter

(57) ABSTRACT

A composition of matter particularly well suited for use as a peelable seal layer is described. The composition comprises from about 50 to about 85 percent by weight of a first polymer and from 15 to 50 percent of a second polymer. The first polymer is a propylene based polymer characterized by having a melting point of at least 125° C. together with a Comonomer Composition Distribution Breadth ("CCDB") less than 2. The second polymer is characterized by having an interfacial adhesion with the first polymer of less than 1 lb/inch.

15 Claims, No Drawings

RETORTABLE EASY OPENING SEALS FOR FILM EXTRUSION

FIELD OF THE INVENTION

The invention relates to a polyolefin-based heat sealable, retortable easy opening seal. The invention also relates to methods of making and using the heat sealable, retortable easy opening seal.

BACKGROUND AND SUMMARY OF THE INVENTION

Heat sealable and easy-opening films are employed on a large scale for temporarily closing containers that include, for example, food products. During use, a consumer tears away the peelable film. To gain consumer acceptance, a number of characteristics associated with a heat sealable and peelable film are desired.

Heat sealable films must be capable of being sealed upon the application of heat. During typical sealing processes, the backing or web layer of the film comes into direct contact with a heated surface such as a sealing jaw. Heat is thus transferred through the backing layer of the film to melt and fuse the inner sealant layer to form a seal. Accordingly the backing layer generally has a higher melting temperature than the inner sealant layer so that the backing layer of the film does not substantially melt and therefore does not stick to the heated surface.

Moreover, if the package to be sealed is designed to contain food, particularly unrefrigerated food, then in order for the product to have an acceptable shelf life (for example at least six months) the seal should be capable of surviving a retort operation. A typical retort process subjects the sealed package to a temperature of 212° F. to 275° F. for 20 to 60 minutes or even up to 100 minutes, depending on the size of the container. During the retort process, gases are generated within the package and pressure increases greatly. Although the retort system may include an over pressure to help balance the package internal pressures, the net result will still be a pressurized package during retorting. Thus, the films used to seal the container must be sufficiently strong to withstand the increased internal pressure and the elevated temperatures.

Because of the need to withstand such pressures, seals used in retort applications are typically difficult to open at room temperature using average manual force. It would be desirable to have a heat sealable film which could withstand the conditions of retort applications yet still be easily opened manually by a consumer. The force required to pull a seal apart is called "seal strength" or "heat seal strength" which can be measured in accordance with ASTM F88-94. The desired seal strength varies according to specific end user applications. For flexible packaging applications, such as cereal liners, snack food packages, cracker tubes and cake mix liners, the seal strength desired is generally in the range of about 1-9 pounds per inch. For example, for easy-open cereal box liners, a seal strength in the range of about 2-3 pounds per inch is commonly specified, although specific targets vary according to individual manufactures requirements. In addition to flexible packaging application, a sealable and peelable film can also be used in rigid package applications, such as lids for convenience items (e.g., snack food such as puddings) and medical devices. Typical rigid packages have a seal strength of about 1-5 pounds per inch. The seal layer can be on the lid or on the container or both.

Another desired property for the heat-sealable films is adequate hot tack. After the film is removed from contact with the heated surface and/or the retort process, the film is cooled to room temperature. Before the inner sealant layer is cooled to room temperature, it should be able to maintain its seal integrity. The ability of an adhesive or sealant layer to resist creep of the seal while it is still in a warm or molten state is generally referred to as "hot tack." To form a good seal, the hot tack of the sealable and peelable film should be adequate.

It is also desirable to have a low heat seal initiation temperature which helps to ensure fast packaging line speeds and a broad sealing window which could accommodate variability in process conditions, such as pressure and temperature. A broad sealing window also enables high speed packaging of heat sensitive products, as well as, provides a degree of forgiveness for changes in packaging or filling speeds.

Additional desired characteristics for heat sealable films include a low coefficient of friction and good abuse resistance. A low coefficient of friction ensures that the sealant layer can be processed smoothly and efficiently on fabrication and packaging equipment and is particularly important for vertical form-fill-and-seal packaging. Good abuse resistance and toughness is desired, for example, in cereal box liners to withstand tears and punctures from irregularly-shaped, rigid cereals. Additional characteristics include taste and odor performance and barrier or transmission properties.

It has been discovered that certain films allow one or more of the desired goals to be met. Such films are characterized by having a peelable seal layer comprising from about 50 to about 85 percent by weight of a first polymer and from 15 to 50 percent of a second polymer. The first polymer is a propylene based polymer characterized by having a melting point of at least 125° C. together with a Comonomer Composition Distribution Breadth ("CCDB") less than 2. The second polymer is characterized by having an interfacial adhesion with the first polymer of less than 1 lb/inch.

DETAILED DESCRIPTION OF THE INVENTION

The term "polymer", as used herein, refers to a polymeric compound prepared by polymerizing monomers, whether of the same or a different type. The generic term polymer thus embraces the term "homopolymer", usually employed to refer to polymers prepared from only one type of monomer as well as "copolymer" which refers to polymers prepared from two or more different monomers.

The following test methods are used throughout the present invention unless otherwise specified.

"Melt strength" which is also referred to in the relevant art as "melt tension" is defined and quantified herein to mean the stress or force (as applied by a wind-up drum equipped with a strain cell) required to draw a molten extrudate at a haul-off velocity at which the melt strength plateaus prior to breakage rate above its melting point as it passes through the die of a standard plastometer such as the one described in ASTM D1238-E. Melt strength values, which are reported herein in centi-Newtons (cN), are determined using a Gottfert Rheotens at 190° C.

"Comonomer Composition Distribution Breadth" ("CCDB") is determined according to the following High Temperature Liquid Chromatography (HTLC) method. HTLC is performed according to the methods disclosed in US Patent Application Publication No. 2010-0093964 and U.S. patent application Ser. No. 12/643,111, filed Dec. 21, 2009, both of which are herein incorporated by reference. The method was also published in the journal article incorporated by reference. Samples are analyzed by the methodology described below.

A Waters GPCV2000 high temperature SEC chromatograph is reconfigured to build the HT-2DLC instrumentation. Two Shimadzu LC-20AD pumps are connected to the injector valve in GPCV2000 through a binary mixer. The first dimension (D1) HPLC column is connected between the injector and a 10-port switch valve (Valco Inc). The second dimension (D2) SEC column is connected between the 10-port valve and, an infrared absorbance detector (IR5). The IR5 detector is used for both concentration and composition measurements.). The IR5 detector is provided by PolymerChar, Valencia, Spain.

Columns. The D1 column is a high temperature Hypercarb graphite column (2.1×100 mm) purchased from Thermo Scientific. The D2 column is a PLRapid-M column purchased from Varian (10×100 mm).

Reagents: HPLC grade trichlorobenzene (TCB) can be obtained from Fisher Scientific. Decane and 2,6-Di-tert-butyl-4-methylphenol (Ionol) can be obtained from Aldrich.

Sample Preparation: 0.2 g of polyolefin sample is placed in a 10-mL Waters autosampler vial. 8-mL of decane with 200 ppm Ionol is added to the vial afterwards. After sparging nitrogen to the sample vial for about 1 min, the sample vial is put on a heated shaker with temperature set at 160° C. The dissolution is done by shaking the vial at the temperature for 2 hr. The vial is then transferred to the autosampler for injection. Please note that the actual volume of the solution may be more than 8 mL due to the thermal expansion of the solvent.

HT-2DLC: The D1 flow rate is set at 0.01 mL/min The composition of the mobile phase is 100% decane for the first 10 min of the run. The composition is then increased to 60% of TCB in 489 min. The data are collected for 489 min as the duration of the raw chromatogram. The 10-port valve switches every three minutes yielding 489/3=163 SEC chromatograms. A post-run gradient is used after the 489 min data acquisition time to clean and equilibrate the column for the next run:

Clean Step:
490 min: flow=0.01 min; // Maintain the constant flow rate of 0.01 mL/min from 0-490 min.
491 min: flow=0.20 min; // Increase the flow rate to 0.20 mL/min.
492 min: % B=100; // Increase the mobile phase composition to 100% TCB
502 min: % B=100; // Wash the column using 2 mL of TCB
Equilibrium Step:
503 min: % B=0; // Change the mobile phase composition to 100% of 1-decanol or decane
513 min: % B=0; // Equilibrate the column using 2 mL of weak eluent
514 min: flow=0.2 mL/min; // Maintain the constant flow of 0.2 mL/min from 491-514 min
515 min: flow=0.01 mL/min; // Lower the flow rate to 0.01 mL/min.

After step 8, the flow rate and mobile phase composition are the same as the initial conditions of the run gradient.

The D2 flow rate is at 2.51 mL/min. Two 60 μL loops are installed on the 10-port switch valve. 30-μL of the eluent from D1 column is loaded onto the SEC column with every switch of the valve.

Signals from IR5 detector may be collected by EZChrom (Agilent) through a SS420X analogue-to-digital conversion box and the chromatograms can be exported in ASCII format and imported into a home-written MATLAB software for data reduction. One signal, referred as 'measure' by the manufacturer, is used to determine concentrations of the eluted polymers. The other signal, referred as 'methyl' by the manufacturer, is used to measure concentrations of methyl groups of the eluted polymers. The ratio of methyl to measure (methyl/measure) is used to determine the compositions of the eluted polymers after calibration. Eight polymers with different propylene contents are used in calibration. The polymers are made by metallocene catalyst giving rise to narrow comonomer composition distribution breadth or CCDB. The compositions of the eight polymer standards are determined by NMR as 0, 20.0, 28.0, 50.0, 86.6, 92.0, 95.8, and 100 weight percent of propylene in polymer (wt % P). The calibration curve is constructed by linear fitting of the methyl/measure versus wt % P of these standards. Analysis of the raw data is calculated as follows: the first dimension HPLC chromatogram is reconstructed by plotting the IR signal of every cut (from total IR SEC chromatogram of the cut) as a function of the elution volume. The IR vs. D1 elution volume is normalized by total IR signal to obtain weight fraction vs. D1 elution volume plot. The IR methyl/measure ratio is obtained from the reconstructed IR measure and IR methyl chromatograms. The ratio is converted to composition using the calibration curve of PP wt. % (by NMR) vs. methyl/measure obtained from second dimension SEC experiments.

The CCD breadth of a polymer sample is calculated according to the following equations:
The weight-averaged chemical composition (Wt % P) of polymer fractions eluted at the earliest elution volume ($CC_{HIGH}$):

$$CC_{HIGH} = \frac{\sum_{0}^{0.25} CC_i W_i}{\sum_{0}^{0.25} W_i} \quad (1)$$

Where $\Sigma_0^{0.25}$ stands for the sum of the earliest 25% of polymer fractions, $CC_i$ is the chemical composition of fraction i in wt % P, and $W_i$ is the weight fraction of fraction i.
The weight-averaged chemical composition (Wt % P) of polymer fractions eluted at the latest elution volume ($CC_{LOW}$):

$$CC_{LOW} = \frac{\sum_{0.75}^{1} CC_i W_i}{\sum_{0.75}^{1} W_i} \quad (2)$$

Where $\Sigma_{0.75}^{1}$ stands for the sum of the latest 25% of polymer fractions, $CC_i$ is the chemical composition of fraction i in wt % P, and $W_i$ is the weight fraction of fraction i.
The CCDB of a polymer sample is:

$$\text{CCD Breadth} = CC_{HIGH} - CC_{LOW} \quad (3)$$

The unit of CCDB is Wt % P.

REFERENCES

D. Lee, M. D. Miller, D. M. Meunier, J. W. Lyons, J. M. Bonner, R. J. Pell, C. Li Pi Shan, T. Hung. Development of high temperature comprehensive two-dimensional liquid chromatography hyphenated with infrared and light scattering detectors for characterization of chemical composition and molecular weight heterogeneities in polyolefin copolymers, J. of Chromatogr. A, 1218 (2011), 7173.

The interfacial adhesion strength between polymers is determined according to the following method:

Sample Preparation:

The face-to-face bonded plaques used for T-peel adhesion force test are prepared by laminate, i.e. melt bonding two compression molded plaques of adherent pairs. The compression molded plaque for melt bonding is 1-mm thick from which peel specimen will be die cut extracted. The sample preparation is detailed as follows:

1st step: compression mold individual plaque at 190° C. under 25000 psi pressure, for 10 minutes.

2nd step: stack a pair, re-mold at 190° C. under 200 psi contact pressure for 10 minutes.

3rd step: The bonded plaques were conditioned in ASTM environment for 48 hours prior to peel test. The bonded plaque was cut into 25 mm by 250 mm strips, with about 75 mm long legs by a NAEF punch press.

T-Peel Test:

The adhesion strength was measured according to ASTM D3330/D3330M type A test for adhesives. This is a 180° peel strength measurement on a partially pre-peeled film with a constant stretching rate of 254 mm/min. At least five sample strips were examined and the peel strength was evaluated by taking the average. All the measurements were conducted in a temperature controlled room at 23° C. The strip was gripped and peeled by an INSTRON Model 1122, made by INSTRU-MET Corporation. The INSTRON was operated with pneumatic grips, separating the two specimen legs at 180°, leaving the bonded area at 90° with each leg, starting from an initial distance between the two grips of about 10 mm, and using a constant separation speed of 254 mm/min. Complete stress-strain curve were recorded for 5 independent specimens per pair, and were subsequently used to quantify the average adhesion strength.

Seal Layer

The peelable seal layers of the present invention comprise at least a first polymer and a second polymer. The first polymer of the present invention comprises from 50 to 90 percent by weight of the seal layer. Preferably the first polymer comprises at least 55 percent, more preferably at least 60 percent or even 70 percent of the seal layer, and less than 85 percent, optionally less than 80 percent or even 75 percent by weight of the seal layer. The second polymer comprises from 10 to 50 percent by weight of the seal layer. Preferably the second polymer comprises at least 15, optionally at least 20 percent of the seal layer, and no more than 45 percent, more preferably no more than 40 percent of the seal layer. It should be understood that the first polymer do not necessarily have to equal 100% of the seal layer, or even 100% of the resin used in the seal layer.

The first polymer is a propylene based polymer characterized by having a melting point of at least 125° C., preferably at least 130° C., more preferably at least 135° C. The melting point of the first polymer is less than 150° C., preferably less than 145° C. The first polymer is further characterized by having a Comonomer Composition Distribution Breadth (or "CCDB") less than 2, preferably less than 1.5, more preferably less than 1, as determined according to the HTLC test method described above.

For purposes of this invention "propylene based" means that at least 50% of the monomer units from which the polymer is derived are propylene. It is generally preferred that the first polymer be derived from at least 90% propylene units, more preferably at least 95% propylene units, and most preferably at least 98% propylene units. If one or more comonomer(s) is (are) present, it may be ethylene or any alpha olefin having from 4-12 carbon atoms, but ethylene is preferred It is preferred that that the propylene based first polymer of the present invention have a melt flow rate (ASTM D-1238, 2.16 kg, 230° C.) in the range of 0.5 to 30 g/10 min more preferably 2 to 25 g/10 min, and most preferably from 5 to 20 g/10 min. In general the first polymer will have a density (as determined according to ASTM D-792) of 0.890 to 0.902 g/cm$^3$, more preferably 0.896 to 0.902 g/cm3. The first polymer for use in the present invention will preferably have a unimodal molecular weight distribution ($M_w/M_n$), and the molecular weight distribution is preferably less than four more preferably less than three.

The first polymers of the present invention are conveniently made using advanced catalyst technology. Suitable catalysts and catalyst precursors for use in the present invention include metal complexes such as disclosed in WO2005/090426, in particular, those disclosed starting on page 20, line 30 through page 53, line 20, which is herein incorporated by reference. Suitable catalysts are also disclosed in US 2006/0199930; US 2007/0167578; US 2008/0311812; U.S. Pat. No. 7,355,089 B2; or WO 2009/012215, which are herein incorporated by reference with respect to catalysts.

Particularly preferred catalysts are those of the following formula:

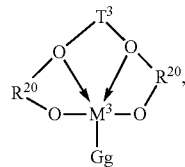

where:

R20 is an aromatic or inertly substituted aromatic group containing from 5 to 20 atoms not counting hydrogen, or a polyvalent derivative thereof;

T3 is a hydrocarbylene or silane group having from 1 to 20 atoms not counting hydrogen, or an inertly substituted derivative thereof;

M3 is a Group 4 metal, preferably zirconium or hafnium;

G is an anionic, neutral or dianionic ligand group; preferably a halide, hydrocarbyl or dihydrocarbylamide group having up to 20 atoms not counting hydrogen;

g is a number from 1 to 5 indicating the number of such G groups; and bonds and electron donative interactions are represented by lines and arrows respectively.

Preferably, such complexes correspond to the formula:

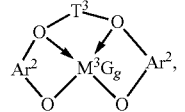

wherein: T3 is a divalent bridging group of from 2 to 20 atoms not counting hydrogen, preferably a substituted or unsubstituted, C3-6 alkylene group; and Ar2 independently each occurrence is an arylene or an alkyl- or aryl-substituted arylene group of from 6 to 20 atoms not counting hydrogen;

M3 is a Group 4 metal, preferably hafnium or zirconium;

G independently each occurrence is an anionic, neutral or dianionic ligand group;

g is a number from 1 to 5 indicating the number of such X groups; and electron donative interactions are represented by arrows.

Preferred examples of metal complexes of foregoing formula include the following compounds:

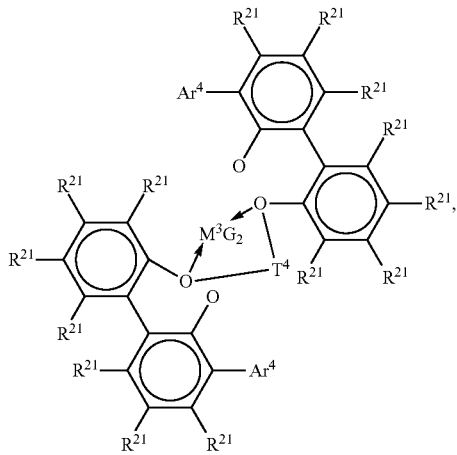

where M3 is Hf or Zr;

Ar4 is C6-20 aryl or inertly substituted derivatives thereof, especially 3,5-di(isopropyl)phenyl, 3,5-di(isobutyl)phenyl, dibenzo-1H-pyrrole-1-yl, or anthracen-5-yl, and T4 independently each occurrence comprises a C3-6 alkylene group, a C3-6 cycloalkylene group, or an inertly substituted derivative thereof;

R21 independently each occurrence is hydrogen, halo, hydrocarbyl, trihydrocarbylsilyl, or trihydrocarbylsilylhydrocarbyl of up to 50 atoms not counting hydrogen; and G, independently each occurrence is halo or a hydrocarbyl or trihydrocarbylsilyl group of up to 20 atoms not counting hydrogen, or 2 G groups together are a divalent derivative of the foregoing hydrocarbyl or trihydrocarbylsilyl groups.

Especially preferred are compounds of the formula:

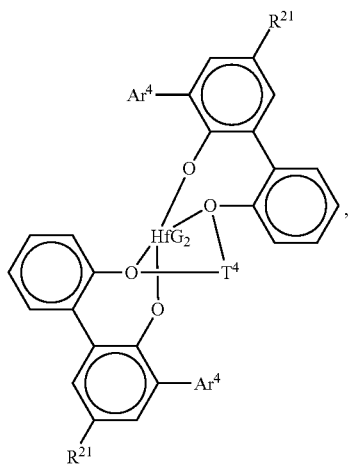

wherein Ar4 is 3,5-di(isopropyl)phenyl, 3,5-di(isobutyl)phenyl, dibenzo-1H-pyrrole-1-yl, or anthracen-5-yl, R21 is hydrogen, halo, or C1-4 alkyl, especially methyl T4 is propan-1,3-diyl or butan-1,4-diyl, and G is chloro, methyl or benzyl.

Other suitable metal complexes are those of the formula:

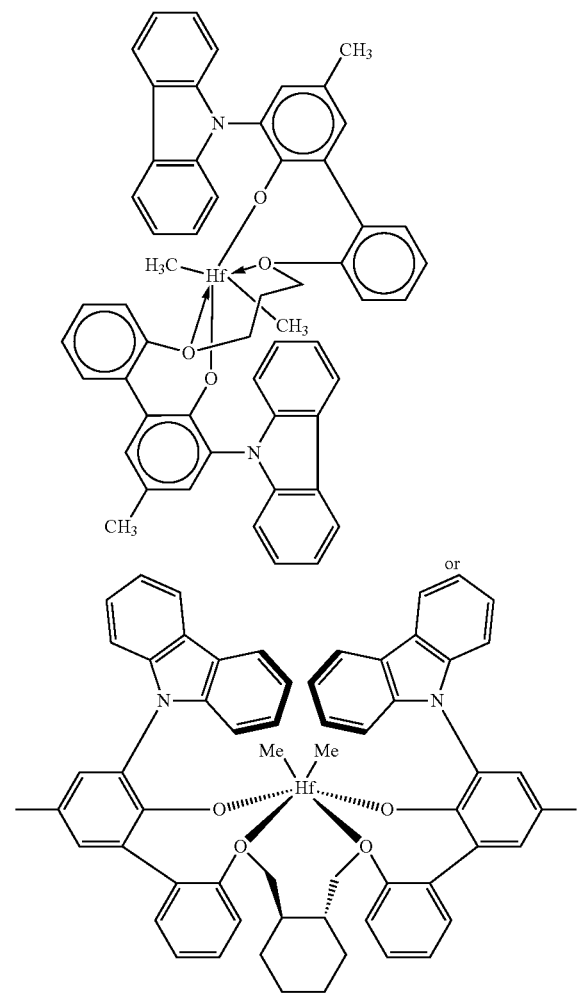

The foregoing polyvalent Lewis base complexes are conveniently prepared by standard metallation and ligand exchange procedures involving a source of the Group 4 metal and the neutral polyfunctional ligand source. In addition, the complexes may also be prepared by means of an amide elimination and hydrocarbylation process starting from the corresponding Group 4 metal tetraamide and a hydrocarbylating agent, such as trimethylaluminum. Other techniques may be used as well. These complexes are known from the disclosures of, among others, U.S. Pat. Nos. 6,320,005, 6,103,657, 6,953,764 and International Publication Nos WO 02/38628 and WO 03/40195.

These polymers can be made using gas phase, slurry or solution processes as is commonly known in the art.

It should be understood that the first polymer may comprise a blend of two or more materials which each comprise a first polymer as described above.

The required second polymer for use in the seal layer of the present invention can be any resin so long as it has an interfacial adhesion with the first polymer of less than 4.5 N/inch, preferably less than 3.5, more preferably less than 2.5 N/inch. Such materials may include polystyrene, polyacrylates, ethylene carboxylic acid (or their derivatives) copolymers or terpolymers (including EVA, EAA, EMAA, EEA), as well as low density polyethylene.

Of particular interest for use as the second polymer of the present invention are polyethylene type resins known in the art as "LDPE". "LDPE" may also be referred to as "high pressure ethylene polymer" or "high pressure low density type resin" or "highly branched polyethylene" and is defined to mean that the polymer is partly or entirely homopolymerized or copolymerized in autoclave or tubular reactors at pressures above 14,500 psi (100 MPa) with the use of free-radical initiators, such as peroxides (see for example U.S. Pat. No. 4,599,392, herein incorporated by reference). In particular, LDPE having a melt index (ASTM D-1238, 2.16 kg, 190° C.) in the range of 0.5 to 20 g/10 min, optionally in the range of 1 to 15 g/10 min. LDPE having a density of from 0.915 to 0.935 g/cm$^3$, more preferably 0.918 to 0.930 g/cm$^3$ is preferred or even 0.920 to 0.925 g/cm3. Ethylene carboxylic acid (or their derivative) copolymers having low comonomer content (e.g. less than 4 percent by weight) may also be preferred for certain applications.

Other materials which can advantageously be used for the second polymer include high density polyethylene ("HDPE"). For HDPE, it is generally preferred that the polymer have an MI in the range of from 0.5 to 10 g/10 min, with a density of from 0.940 to 0.960 g/cm$^3$. For the ethylene-polar comonomer copolymers, it is generally preferred that the polymer have an MI in the range of from 0.5 to 10 g/10 min.

Other polymeric materials which may be included in the peelable seal layer in addition to the first polymer and the second polymer include homopolymer polypropylene and/or polystyrene. If homopolymer polypropylene is present, it is preferred that it comprise no more than 30% by weight of the seal layer, more preferably in the range of 5 to 30%. Homopolymer polypropylene having am MFR of from 0.5 to 10 g/10 min (ASTM D-1238, 2.16 kg, 230° C.) is generally preferred. If polystyrene is present it is generally preferred that it comprise no more than 10 percent of the seal layer, more preferably in the range of from 5 to 10%, and have a melt flow rate (ASTM D-1238, 2.16 kg, 190° C.) from 0.5 to 10 g/10 min.

It should be understood that the second polymer may comprise a blend of two or more materials which each comprise a second polymer as described above.

In certain embodiments, it may be especially preferable to include HDPE which is not necessarily a second polymer in the seal layer of the present invention. In particular it has been observed that the presence of HDPE in addition to the first and second polymer helps in maintaining desired peel force.

The seal layer of the present invention may also contain additives as known in the art. Such additives include materials such as inorganic fillers such as talc, conductive fillers, pigments, nucleators, clarifiers, antioxidants, acid scavengers, flame retardants, ultraviolet absorbers, processing aids such as zinc stearate, extrusion aids, slip additives, tackifiers, permeability modifiers, anti-static agents and antiblock additives. In some embodiments it is preferred that the seal layer contain from 1 to 20% by weight talc and or from 1 to 20% by weight of a tackifier.

The seal layer of the present invention may be coextruded, laminated, etc to other layers to form the peelable film as is generally known in the art.

It is preferred that the seal layer has a thickness less than 30 microns, preferably less than 20 microns, more preferably 10 microns or less. It is preferred that the film have a total thickness of less than 200 microns, more preferably less than 150 microns.

For flexible packaging, peelable seals generally have a defined seal strength in the range of 1 to 9 lbs./inch. For example, for easy open cereal box liners, a heat seal strength in the range of 2 to 3 lbs./inch is commonly specified, although specific targets vary according to individual manufacturer's requirements.

Generally, a peelable seal is in the form of a film or layer. A peelable seal can be a monolayer or multilayer. For example, a peelable seal may include two layers: one sealant layer and a base layer for support. In some embodiments, a peelable seal may include three layers: a sealant layer which is one of the outer layers and two base layers which may or may not have the same compositions. Multiple layer structures, such as a four layered structure, five layered structure, six layered structure, or more layers, may also be made, if desired, so long as at least one of the outer layers is a heat sealant layer which is made from the polymer blend described herein.

EXAMPLES

All the raw materials used in this study are shown in Table 1.

TABLE 1

Raw Materials

| Material | Description | Melt Flow Rate (g/10 min at 230° C./ 2.16 kg) | Density g/cc | Melting point (Degrees C) | CCDB |
|---|---|---|---|---|---|
| Resin A | Polypropylene based plastomer or elastomer (ethyelene comonomer) | 8 | 0.897 | 132 | 0 |
| Resin B | Clarified Z-N catalyzed random PP compolymer (3.2% ethylene) | 1.9 | 0.900 | >140 | 2.75 |
| Resin C | Low Density Polyethylene | 2.0* | 0.922 | 116 | |
| Resin D | PP homopolymer | 2 | 0.902 | 160 | |
| Resin E | Polypropylene based plastomer or elastomer (ethyelene comonomer) | 2 | 0.888 | 115 | |
| Resin F | Hydrogenated C5 hydrocarbon (Tackifier resin) | | | Softening point of 140 | |

*MI (g/10 min at 190° C./2.16 kg)
The interfacial tension of Resin C with each of the other resins is less than 1.5 N.

Peel Sealant Compounding

Compounding is performed on a 30 mm twin-screw extruder with a total length-to-diameter ratio (L/D) of 28. The polymers are fed using a K-TRON SODER K2LS60 Loss-In-Weight Feeder. The blend composition is pelletized using an underwater pelletization unit with a 1-hole die.

Blown Film Fabrication

Blown films are made on a 3 layer coextrusion blown film line manufactured by Dr. Cohn GmbH. Monolayer or co-ex film structures are created using multiple extruders (25 mm (Ex25A), 30 mm (Ex.30) and 25 mm (Ex.25B)). An average total output of all the three extruders (depending on the material used) is 10-11 kg/hr, and this is calculated using the gravimetric feeding system equipped on each extruder. Each extruder has a standard single flight forwarding screw in which optional mixing heads can be attached at the end. However, standard practice is no mixing heads, so none are used in these examples.

The die diameter is 60 mm, and multiple die gap options with the "standard" being 2 mm (as used in this project). Maximum takeoff speed of the line is 30 m/min, and will run as slow as material allows with stability (typically around 4 m/min) A typical BUR (blow up ratio) used is 2.5:1, but during this project it was requested to go to the highest allowable ratio, which came out to be approximately 3.2:1 for each sample. An average takeoff speed during this project was 6.8 m/min. Ideally all three extruders are used for all applications to give the highest level of orientation in the film as possible. This typically requires a minimum of approximately 30 lb of each material needed.

Retort Process:

The retort (steam sterilization) process is performed on a LI 250 laboratory steam sterilizer. The model is AMSCO LAB 250 from Steris.

The chamber starts at 71° C., then is ramped up over a period of approximately 15 minutes to a temperature of 122 degrees. This temperature is held for approximately 60 minutes, and then heating is turned off. After about 25 minutes the temperature reaches a temperature of approximately 99 degrees at which time the samples were removed from the chamber. During retort process, a the chamber is pressurized to 18 psig using compressed air.

Table 2 lists the formulation of comparative and inventive peel sealant compounds.

TABLE 2

| | Formulation of comparative examples | | | |
|---|---|---|---|---|
| | Comparative example 1 | Comparative example 2 | Comparative example 3 | Comparative example 4 |
| | (Surface peel seals) | | | |
| Film Structure | A/A/A/B/A 25/25/25/20/5 | A/A/A/B/A 25/25/25/20/5 | A/A/A/B/A 25/25/25/20/5 | A/A/A/B/A 25/25/25/20/5 |
| Film thickness (micron) | 100 | 100 | 100 | 100 |
| Film Layer composition | A: Resin B B: Variable composition as described below | | | |
| Expected Failure Mechanism | Burst + cohesive | Burst + cohesive | Burst + cohesive | Burst + cohesive |
| Resin E | 15.0 | | 15.0 | 15.0 |
| Resin C | 30.0 | 30.0 | 40.0 | 20.0 |
| Resin B | 55.0 | 70.0 | 45.0 | 65.0 |
| Resin D | | | | |
| Resin F | | | | |
| Total | 100.0 | 100.0 | 100.0 | 100.0 |
| Appearance of the peel surface | Stringing | Stringing | Stringing | Stringing |
| Blocking during retort | No | No | No | No |

| | Comparative example 5 | Comparative example 6 | Comparative example 7 | Comparative example 8 | Comparative example 9 | Comparative example 9 |
|---|---|---|---|---|---|---|
| Film Structure | A/A/A/A/B 20/20/20/20/20 | A/A/A/A/B 20/20/20/20/20 | A/A/A/A/B 20/20/20/20/20 | A/A/A/A/B 20/20/20/20/20 | A/A/A/A/B 20/20/20/20/20 | A/A/A/A/B 20/20/20/20/20 |
| Film thickness (micron) | 100 | 100 | 100 | 100 | 100 | 100 |
| Film Layer composition | A: Resin B B: Vairable composition as described below | | | | | |
| Expected Failure Mechanism | Cohesive | Cohesive | Cohesive | Cohesive | Cohesive | Cohesive |
| Resin E | 5.0 | | 5.0 | 5.0 | 5.0 | 5.0 |
| Resin C | 35.0 | 35.0 | 25.0 | 35.0 | 30.0 | 25.0 |
| Resin B | 60.0 | 65.0 | 60.0 | | 65.0 | 70.0 |
| Resin D | | | | 60.0 | | |
| Resin F | | | 10 | | | |
| Total | 100.0 | 100.0 | 100.0 | 100.0 | 100.0 | 100.0 |
| Appearance of the peel surface | Clean | Clean | Clean | Clean | Clean | Clean |
| Blocking during retort | Yes | Yes | Yes | Yes | Yes | Yes |

TABLE 3

| | Formulation of inventive examples | | |
|---|---|---|---|
| | Inventive example 10 | Inventive example 11 | Inventive example 12 |
| Film Structure | A/A/A/A/B 20/20/20/20/20 | A/A/A/A/B 20/20/20/20/20 | A/A/A/A/B 20/20/20/20/20 |
| Film thickness (micron) | 100 | 100 | 100 |
| Film Layer composition | A: Resin B B: Variable composition as described below | | |
| Expected Failure Mechanism | Cohesive | Cohesive | Cohesive |

TABLE 3-continued

Formulation of inventive examples

| | Inventive example 10 | Inventive example 11 | Inventive example 12 |
|---|---|---|---|
| Resin C | 20.0 | 30.0 | 40.0 |
| Total | 100.0 | 100.0 | 100.0 |
| Appearance of the peel surface | Clean, No stringing | Clean, No stringing | Clean, No stringing |
| Blocking during retort | No | No | No |

Film Property Characterization

Heat Seal Testing

The heat seal test is based upon ASTM F88-06, Standard Test Method for Seal Strength of Flexible Barrier Materials.

The film-to-film heat seal is conducted on an Enepay MAGMA Hot Tack and Heat Seal Test System. The film is folded with the sealant side facing each other. In order to prevent burning through at high seal temperatures, the films are sandwiched by a 50 μm thick Mylar PET film prior to being inserted in between the upper and lower seal bars which were perpendicular to the film machine direction. The flat jaw is loaded. The films are sealed at specified temperatures for 0.5 seconds under a constant pressure of 0.275 N/mm2, and allowed to cool completely to room temperature (23° C.). The specimens are conditioned at 23° C. and 50% relative humidity for a minimum of 24 hours prior to testing. The temperature increment for the measurement is 10° C. between 70° C. and 110° C., then 20° C. between 110° C. and 170° C.

For the samples which were subjected to a retort process, as described above. Blocking, or other change in the dimensions of the seal during the retort process, were noted in tables 2 and 3.

The sealed samples are conditioned in ASTM environment for 48 hours prior to peel test. Five 1×6 inch strips across the seal bar are punched by a NAEF PUNCH PRESS. The strip is then gripped and peeled by an INSTRON Model 1122, made by INSTRU-MET Corporation. The INSTRON is operated with pneumatic grips, separating the two specimen legs at 180°, leaving the sealed area at 90° with each leg (unsupported protocol), starting from an initial distance between the two grips of about 10 mm, and using a constant separation speed of 254 mm/min. Complete stress-strain curves are recorded for 5 independent specimens per seal, and are subsequently used to quantify the maximum seal strength, which is reported as peel strength for seals. The seal failure mode is also determined by visual observation of the broken specimens, according to ASTM F88-06. The presence of strings, an undesirable trait, was noted in Tables 2 and 3. The experimental conditions for sealant-to-sealant heat seal measurement are tabulated in Table 4.

Hot Tack Testing

Hot tack properties of the sample films is measured using an Enepay MAGMA Hot Tack and Heat Seal Test System (available from Enepay Corporation, Raleigh, N.C.), based upon ASTM F 1921, Standard Test Methods for Hot Seal Strength (Hot Tack) of Thermoplastic Polymers and Blends Comprising the Sealing Surfaces of Flexible Webs, Method B. The experimental conditions for sealant-to-sealant hot tack measurement are tabulated in Table 4.

TABLE 4

Experimental conditions for peel seal tests

| Sealing Condition | Type of seal - heat | 2-side heating |
|---|---|---|
| | Sample width | 25.4 mm |
| | Seal width | 5 mm |
| | Dwell time | 0.5 s |
| | Pressure | 0.3 N |
| | Conditioning hours | 48 hr |
| | Seal temp range | 70° C. to 170° C. |
| | Temp interval | 10° C. from 70 to 110, 130, 150, 170 |
| T-Peel Test | Speed | 254 mm/min |
| Hot-Tack Test | Sample width | 25.4 mm |
| | Sealing width | 5 mm |
| | Sealing pressure | 0.275 N |
| | Dwell time | 0.5 s |
| | delay time | 0.1 s |
| | Test speed | 200 mm/s |
| | Temp range* | 70° C. to 130° C. |
| Haze | | External haze |

* Hot tack data are collected at 10° C. temperature increments.

Haze

External haze is measured using a Hazeguard Plus manufactured by Folio according to ASTM D1003, Standard Test Method for Haze and Luminous Transmittance of Transparent Plastics, on PET laminated films. The percentage of luminous transmission which is passing through the specimen deviates from the incident beam by forward scattering. For the purpose of this method only luminous flux deviating more than 2.5° on the average is considered haze. Five samples are prepared across with of the specimen approximately 6"×6". The samples are chosen randomly across both axes to provide a more homogenous sample selection. The samples are placed in a ring fixture to remove surface wrinkles. After running a calibrated sample, each specimen is held across the transmitter and the results are recorded. Specimen thickness is measured as well, taking the average of three readings using a flat headed digital micrometer.

Results:

RCPP based "buried" peel seal compositions show undesirable stringing phenomena during peeling, which is believed to be due to the partial delamination between the peel layer and the backing layer. (comparative examples 1-4 in table 2)

RCPP based surface peel seal compositions experience blocking during the retort process.

Inventive PP based surface peel seal compositions have neither stringing nor blocking issue.

Peel strength has minimum change after retort for both comparative examples and inventive examples

What is claimed is:

1. A composition suitable for use as a peelable seal layer comprising:
    a. from about 50 to about 90 percent by weight of a first polymer comprising a propylene based polymer characterized by having:
        i. a melting point of at least 125° C.;
        ii. a Comonomer Composition Distribution Breadth less than 2;
    b. from about 10 to about 50 percent by weight of a second polymer which has interfacial adhesion with the first polymer of less than 4.5 N/inch.

2. The composition of claim 1 wherein the second polymer is a high pressure low density polyethylene.

3. The composition of claim 2 wherein the high pressure low density polyethylene has a melt index (as determined according to ASTM D-1238, 2.16 kg, 190° C.) of 0.5 to 10 g/10 min.

4. The composition of claim 2 wherein the high pressure low density polyethylene has a density of from 0.94 to 0.96 g/cm$^3$.

5. The composition of claim 1 wherein the first polymer has a melt flow rate (as determined according to ASTM D-1238, 2.16 kg, 230° C.) of from 0.5 to 30 g/10 min.

6. The composition of claim 1 wherein the first polymer has an MFR of from 5 to 20 g/10 min.

7. The composition of claim 1 wherein the first polymer has an MWD less than 3.

8. The composition layer of claim 1 wherein the first polymer comprises less than 5% of units derived from a monomer other than propylene.

9. The composition of claim 1 wherein the first polymer has a CCDB less than 1.

10. The composition of claim 1 where the first polymer comprises from 60 to 80 percent by weight of the composition.

11. The composition of claim 1 where the second polymer comprises from 20 to 40 percent by weight of the composition.

12. The composition of claim 1 further comprising an additional polymer selected from the group consisting of polystyrene, homopolymer polypropylene, and high density polyethylene.

13. The composition of claim 12 where the additional polymer is a High Density Polyethylene (HDPE).

14. A film or film layer comprising:
   a. from about 50 to about 90 percent by weight of a first polymer comprising a propylene based polymer characterized by having:
      i. a melting point of at least 125° C.;
      ii. a Comonomer Composition Distribution Breadth less than 2;
   b. from about 10 to about 50 percent by weight of a second polymer which has interfacial adhesion with the first polymer of less than 4.5 N/inch.

15. The film of claim 14 wherein the film is a multilayer film having a seal layer and the seal layer comprises:
   a. from about 50 to about 90 percent by weight of a first polymer comprising a propylene based polymer characterized by having:
      i. a melting point of at least 125° C.;
      ii. a Comonomer Composition Distribution Breadth less than 2;
   b. from about 10 to about 50 percent by weight of a second polymer which has interfacial adhesion with the first polymer of less than 4.5 N/inch.

* * * * *